United States Patent
Krummrich

(10) Patent No.: US 6,707,598 B2
(45) Date of Patent: Mar. 16, 2004

(54) PUMP SOURCE WITH INCREASED PUMP POWER FOR OPTICAL BROADBAND RAMAN AMPLIFICATION

(75) Inventor: Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 10/099,416

(22) Filed: Mar. 15, 2002

(65) Prior Publication Data

US 2002/0149842 A1 Oct. 17, 2002

(30) Foreign Application Priority Data

Mar. 16, 2001 (DE) .......................... 101 12 806

(51) Int. Cl.$^7$ ................................ H01S 3/00
(52) U.S. Cl. .................... 359/334; 359/341.3
(58) Field of Search ............... 359/334, 341.3

(56) References Cited

U.S. PATENT DOCUMENTS 6,147,794 A * 11/2000 Stentz ..................... 359/334
6,480,326 B2 * 11/2002 Papernyi et al. ........... 359/334

FOREIGN PATENT DOCUMENTS

| DE | 100 48 460 | 4/2002 |
| EP | 1 168 530 | 1/2002 |
| WO | WO 00/49721 | 8/2000 |

* cited by examiner

Primary Examiner—Mark Hellner
(74) Attorney, Agent, or Firm—Bell Boyd & Lloyd LLC

(57) ABSTRACT

A pump source for broadband amplification of a wavelength-division multiplexed signal transmitted via an optical fiber having a number of low-power pump lasers, whose input signal power levels are increased in a conversion fiber. One or more high-power lasers such as Raman cascade lasers on the one hand, and one or more monomode laser diodes with a low output power, on the other hand, are used as the pump lasers. Pump signals from the monomode laser diodes are subjected to Raman amplification in the conversion fiber before providing broadband amplification of the WDM signal in the transmission fiber by stimulated Raman scatter. The powers required for the amplified pump signals at the output of the conversion fiber are achieved by respective pump power increases in the pump signals of the monomode laser diodes, and by using monomode laser diodes with different output powers, as well as via a corresponding arrangement of the input coupling of the output signals of the pump lasers into the conversion fiber.

17 Claims, 4 Drawing Sheets

PUMP SOURCE WITH INCREASED PUMP POWER FOR OPTICAL BROADBAND RAMAN AMPLIFICATION

BACKGROUND OF THE INVENTION

The present invention relates, generally, to a pump source with increased pump power for optical broadband Raman amplification of a wavelength-division multiplexed (WDM) signal.

Booster amplifiers are required along the optical transmission path for long-distance transmission of a WDM signal. For broadband amplification, Raman amplifiers with a number of pump lasers must have a high gain and a flat gain spectrum for the channels of the WDM signal in L band and C band. Pump sources with pump lasers having different output wavelengths are required for this purpose. The wavelengths and the output powers of the pump lasers must be selected optimally.

Such a Raman amplifier is described, for example, in a prior German patent application with the file reference P 10048460.3, in which pump signals which are produced by a number of pump lasers and are at different pump wavelengths are fed in opposite directions into the transmission fiber so that a WDM signal is amplified by stimulated Raman scatter. The powers of the pump lasers are chosen, and the pump wavelengths are arranged, such that all the channels of the WDM signal have a flat profile of the signal-to-noise ratio (OSNR) at the transmission fiber end. In addition, a filter (F) is connected to the output of the Raman amplifier in order to equalize all the channel levels, in order for the level profile of all the channels likewise to be flat. In consequence, all the channels of a WDM signal have the same signal-to-noise ratio and are at the same level at the fiber end.

Pump laser output powers of several hundred milliwatts are required for the gain values of approximately 10 dB to 20 dB that are relevant in practice. Until now, two major technologies have been known for producing such high pump powers. The first technology is based on a high-power Raman cascade laser, which has one row of low-cost laser diodes with output wavelengths around 920 nm, and has a fiber laser doped with an element from the group of rare earths. The output signal from the laser diode row is fed into the outer core, which carries multiple modes, of the active fiber of the ytterbium doped or neodym-doped fiber laser. This produces a transverse monomode output signal in the wavelength range around approximately 1100 nm or 1064 nm. In order to convert the signal in the wavelength region around approximately 1450 nm which is desired for pumping the Raman amplifier, the signal is also converted in a number of stages in a Raman cascade laser with fiber gratings and an efficient amplifier fiber. This allows output powers of well above 1 watt to be produced. The output signal from the Raman cascade laser has a narrow spectral width, however, and thus is not suitable on its own as a pump for a broadband Raman amplifier.

The second technology uses a so-called monomode WDM pump source with laser diodes which emit at different wavelengths (from about 1400 nm to 1500 nm) and which emit a transverse monomode output signal. A fiber grating is provided in the output fiber of the individual laser diodes for stabilization at the respectively desired pump wavelength. A wavelength-selective WDM multiplexer then combines all the pump signals. The pump wavelengths and the pump powers of the individual laser diodes are chosen such that the Raman amplifier has a flat input/output gain spectrum. This technology has the disadvantage that very high-power, and hence expensive, laser diodes must be used, since high powers are required for the individual pump wavelengths. In some cases, it even may be necessary to use two laser diodes rather than one laser diode, whose pump signals at identical wavelengths are combined via a polarization multiplexer. Since a number of very high-power and relatively expensive transverse monomode laser diodes are required, this technology is associated with high costs.

An object of the present invention is, thus, to specify a pump source with a high broadband output power for Raman amplification of a WDM signal, in which there is no need to use expensive laser diodes.

SUMMARY OF THE INVENTION

The fundamental idea of the pump source designed according to the present invention is the combination of at least one high-power laser, particularly a Raman cascade laser, with a number of monomode laser diodes with a low output power. This has the advantageous feature that low-power, and hence low-cost, pump lasers are used for the monomode laser diodes, and very high-power transverse monomode, and therefore also low-cost, lasers are used for the Raman cascade laser.

By transmitting the output signal from the cascade laser and all the output signals from the monomode laser diodes via a conversion fiber, the pump signals from the monomode laser diodes are subjected to Raman amplification. They then can be used as pump signals for Raman amplification of the WDM signals to be transmitted. This efficiently increases the originally low output powers of the monomode laser diodes.

A number of arrangements of the pump source according to the present invention are possible, which require only low output powers from the monomode laser diodes and can, nevertheless, produce the high pump powers which are required for a flat gain spectrum in the wavelength range of the WDM signals.

A coupling device for combining the pump signals at the various pump wavelengths has a greater number of inputs than the number of pump signals, so that the desired increases in the output powers for the monomode laser diodes are achieved during Raman amplification of the pump signals both for small and large wavelength separations between the pump signals from the cascade laser and the monomode laser diodes.

The conversion fiber of the pump source according to the present invention may have a number of series-connected conversion fiber sections. The pump signals from the monomode laser diodes are fed into different conversion fiber sections, depending on the wavelength separations between the pump signal of the cascade laser and the further pump signals to be amplified. An increase in the low Raman amplification for the pump signals at short wavelengths is achieved during transmission via a large number of conversion fiber sections. Individual monomode laser diodes or various modules of monomode laser diodes also can be coupled in between different conversion fiber sections.

In order to increase the output power amplification of monomode laser diodes with short wavelengths, low-power monomode laser diodes are used whose output power decreases as the wavelengths increase. This takes account of the increase in the output power by Raman amplification, which increases as the wavelength separations increase between the pump signals of the Raman cascade laser and those of the monomode lasers.

DETAILED DESCRIPTION OF THE INVENTION

Figure 1:
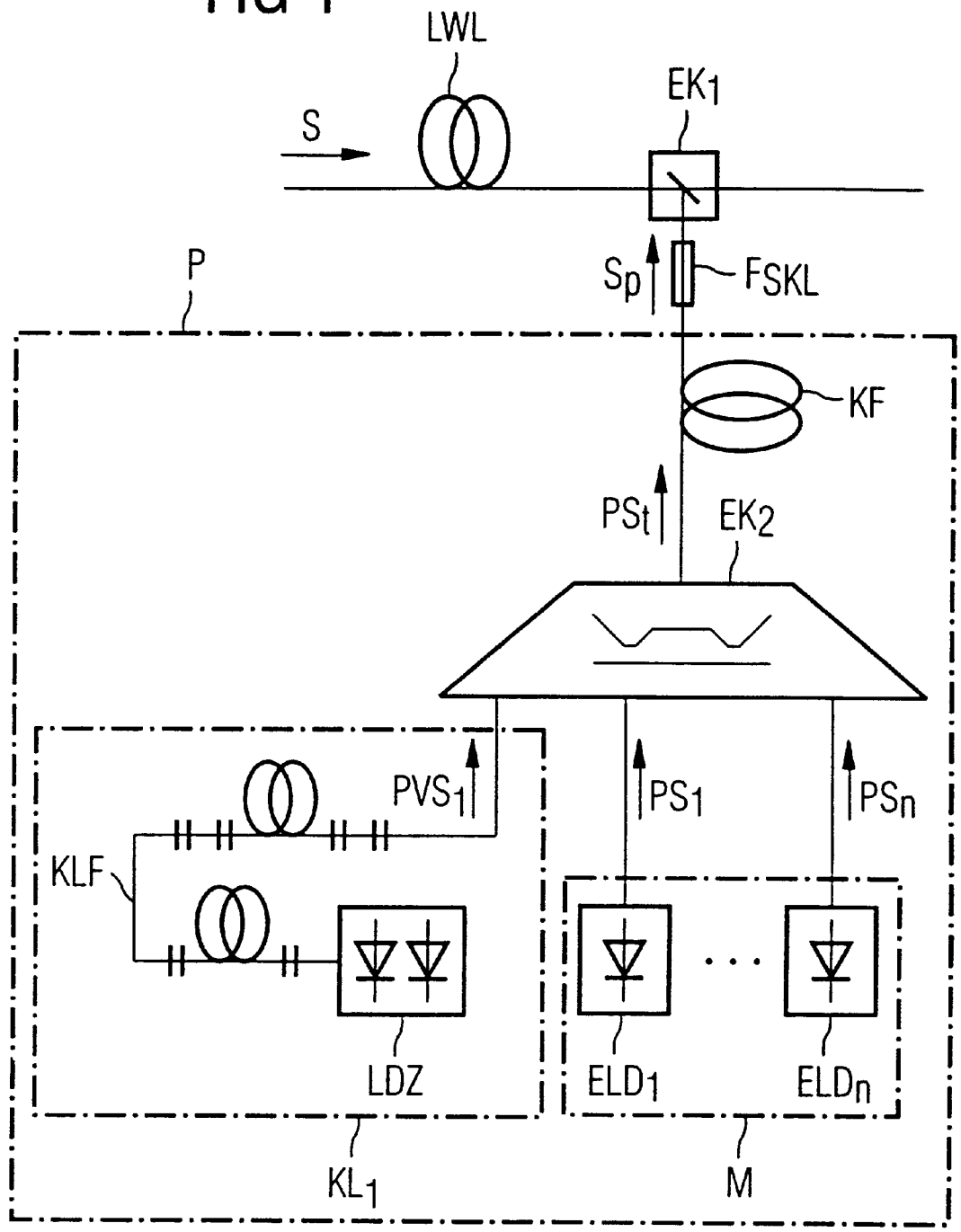
FIG. 1 shows a pump source according to the present invention with a periodic filter as the input coupling device into the conversion fiber.

In the exemplary embodiment illustrated in FIG. 1, a pump signal $S_P$, which is supplied via a conversion fiber KF from a pump source P, is fed via a first input coupling device $EK_1$ into an optical fiber LWL for Raman amplification of a transmitted WDM signal S. The pump source P has a cascade laser $KL_1$ and a module M with a number of monomode laser diodes $ELD_1$, $ELD_2$, ..., $ELD_n$, whose respective pump signals, namely the pump signal $PVS_1$ from the cascade laser $KL_1$ on the one hand and the pump signals $PS_1$, $PS_2$, ..., $PS_n$ from the module on the other hand, are combined as a sum signal $PS_r$. In this case, the pump signal $PVS_1$, whose wavelength is the shortest, from the cascade $KL_1$ is combined with the pump signals $PS_1$, $PS_2$, ..., $PS_n$ from the module M in a second input coupling device $EK_2$ to form the sum signal $PS_r$. The pump signal $PVS_1$ is produced by Raman amplification after feeding the output signals from one or more lasers, or from so-called laser diode rows LDZ, into an active fiber KLF.

For broadband Raman amplification of the pump signals $PS_1$, $PS_2$, ..., $PS_n$, a number of cascade lasers $KL_1$, $KL_2$, ... also can be used, with corresponding pump signals $PVS_1$, $PVS_2$, .... However, only one cascade laser $KL_1$ is described in this example and is illustrated in the following figures.

This sum signal $PS_r$, which is produced at the output of the second input coupling device $EK_2$ is supplied to the conversion fiber KF connected there, in which the pump signal $PVS_1$ emits power to the other pump signals $PS_1$, $PS_2$, ..., $PS_n$, which are each at longer wavelengths. The conversion fiber KF allows this energy transfer via stimulated Raman scatter and has a particularly high Raman efficiency due to its small mode field diameter. High Raman coefficients can be achieved when using silicate glass fiber via, for example, high germanium doping in the core of the conversion fiber KF. This doping likewise is required to achieve a large difference in the refractive indices between the core glass and the outer glass, which leads to a large numerical aperture, powerful wave guidance and, thus, to a small mode field diameter. Other glass systems with high Raman coefficients also may be used for the conversion fiber KF.

A dielectric filter, also referred to as an interference filter, or periodic filter structures such as Mach-Zehnder interferometers optionally may be used for the second input coupling device $EK_2$. The use of periodic filter structures in this case requires that the pump wavelengths be arranged at equal intervals. In this case, the second shortest pump wavelength of the monomode laser diode $ELD_1$ is separated only by a small amount from the shortest wavelength of the cascade laser $KL_1$. The pump signal $PS_1$ thus experiences little Raman amplification (see "Fiber-Optic Communication Systems", 2nd Edition, Govind P. Agrawal, page 381, FIG. 8.11). Furthermore, the pump signal $PS_2$ experiences greater Raman amplification.

A corresponding situation applies to the other pump signals $PS_i$ (i>2). For this reason, the monomode laser diode $ELD_1$, for example, must have a higher original output power than that of the further monomode laser diode $ELD_2$ whose wavelength separation from the pump signal $PVS_1$ is greater. The monomode laser diodes are, therefore, chosen such that they supply correspondingly reduced output powers at increasing wavelengths.

In order to increase the output power at the second shortest wavelength, a periodic filter may be used for the second input coupling device $EK_2$, having more inputs than the number of pump signals that are fed in. The pump signal $PVS_1$ is supplied at the input for the shortest wavelength, while the further pump signals $PS_1$, $PS_2$, ..., $PS_n$ from the monomode laser diodes are supplied to the inputs for the longer wavelengths. One or more inputs between the input for the pump signal $PVS_1$ and the inputs for the pump signals $PS_1$, $PS_2$, ..., $PS_n$, remains or remain unused, thus leading to a greater wavelength separation between the shortest pump wavelength and the adjacent pump wavelengths.

In addition, in order to suppress the pump signal $PVS_1$ from the cascade laser $KL_1$, a filter $F_{SKL}$ can be used at the end of the conversion fiber KF, provided the Raman amplification of the WDM signal S does not require a pump signal $PVS_1$ and the pump signal $PVS_1$ is not intended to be coupled into the transmission fiber LWL.

In a first implementation of the exemplary embodiment illustrated in FIG. 1, the pump source P according to the present invention has one cascade laser $KL_1$ and seven monomode laser diodes $ELD_1$, $ELD_2$, ..., $ELD_7$, including two Fabry-Perot lasers and five DFB lasers. The pump source achieves a uniform Raman gain of approximately 10 dB in C band and L band. At wavelengths of 1409 nm or 1424 nm, 1438 nm, 1453 nm, 1467 nm, 1482 nm, 1497 nm and 1513 nm, the cascade laser $KL_1$ and the monomode laser diodes $ELD_1$, $ELD_2$, ..., $ELD_7$ have output powers of 31.2 dBm or 22.3 dBm, 16.4 dBm, 13.9 dBm, 9.6 dBm, 0.5 dBm, −5 dBm, and −5 dBm before being coupled into the conversion fiber KF, and of 27.0 dBm or 23.5 dBm, 20.2 dBm, 19.9 dBm, 18.8 dBm, 14.4 dBm, 14.1 dBm, and 16.4 dBm at the end of the conversion fiber KF.

In a second implementation of the exemplary embodiment shown in FIG. 1, the pump source P has one cascade laser $KL_1$ and four DFB lasers (Distributed Feedback Lasers) as the monomode laser diodes $ELD_1$, $ELD_2$, ..., $ELD_4$ for a uniform Raman gain of approximately 10 dB in L band. At wavelengths of 1404 nm or 1453 nm, 1467 nm, 1482 nm and 1510 nm, the cascade laser $KL_1$ and the monomode lasers $ELD_1$, $ELD_2$, ..., $ELD_4$ have output powers of 33.0 dBm or 13.3 dBm, 5.8 dBm, −5 dBm, and 4 dBm before being coupled into the conversion fiber KF, and of 23.1 dBm, 22.0 dBm, 20.0 dBm, and 24.1 dBm at the end of the conversion fiber KF.

Figure 2:
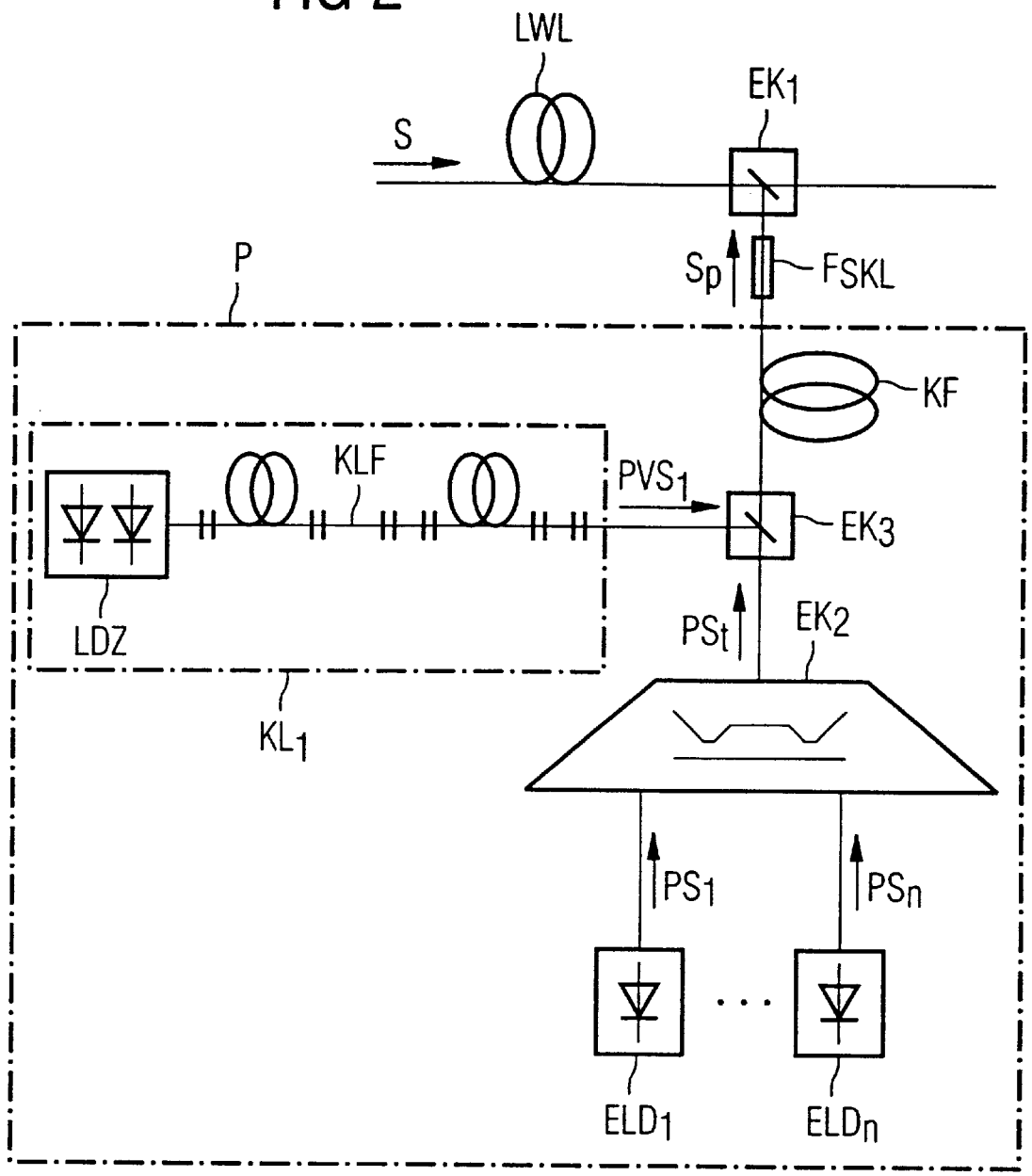
FIG. 2 shows a pump source according to the present invention with separate input coupling devices into the conversion fiber.

FIG. 2 shows an alternative for the pump source P according to the present invention, in which the pump signal $PVS_1$ of the cascade laser $KL_1$ is fed into the conversion fiber KF via a third input coupling device $EK_3$, which is connected in series with the second input coupling device EK$_2$ as shown in FIG. 1, as a WDM filter. The individual pump signals PS$_1$, PS$_2$, . . . , PS$_n$ also can be combined via an input coupling device EK$_2$, which is in the form of a dielectric filter, to produce the sum signal PS$_r$, thus allowing the individual wavelengths to be chosen in a flexible manner.

Figure 3:
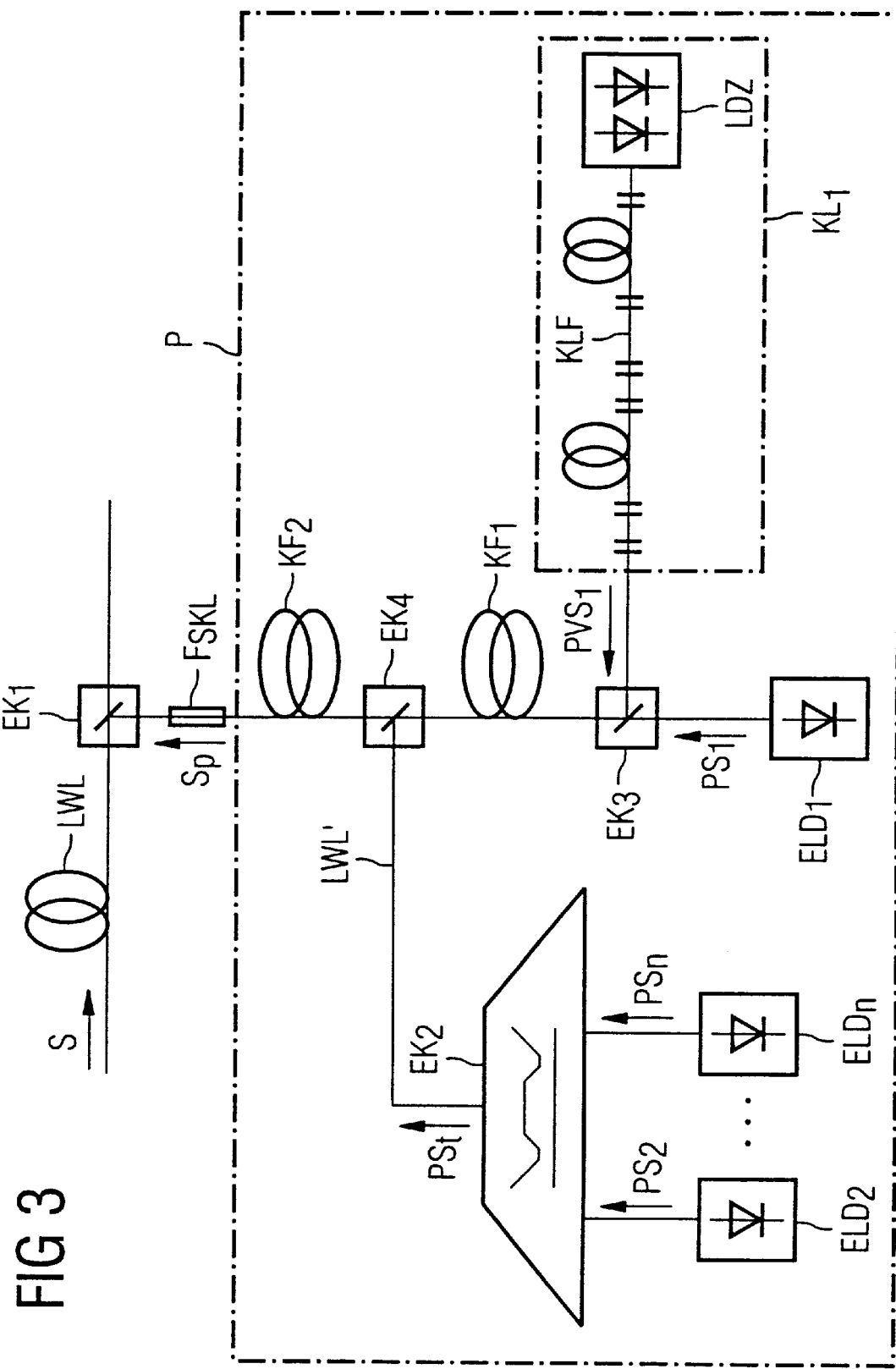
FIG. 3 shows a pump source according to the present invention with a conversion fiber split for a single monomode laser diode.

FIG. 3 shows a further option for increasing the gain when there is only a small wavelength separation between the pump signal PVS$_1$ and the pump signal PS$_1$. This is done by disconnecting the monomode laser diode ELD$_1$ from the other monomode laser diodes ELD$_2$, . . . , ELD$_n$ at higher wavelengths, and connecting it to the input of the conversion fiber. There, the pump signal PVS$_1$ is also fed into the conversion fiber via a third input coupling device EK$_3$. In contrast to the conversion fiber KF in FIG. 2, this conversion fiber is split into two series-connected conversion fiber sections KF$_1$ and KF$_2$. The pump signals from the other monomode laser diodes ELD$_2$, . . . , ELD$_n$ are combined via the second input coupling device EK$_2$ to form the sum signal PS$_r$, and are fed as such via an optical connecting fiber LWL' and a fourth input coupling device EK$_4$ into the second conversion fiber section KF$_2$. In this arrangement, the pump signal PS$_1$ experiences Raman amplification via the two conversion fiber sections KF$_1$ and KF$_2$. In contrast to the pump signal PS$_1$, the sum signal PS$_r$ from the further pump signals PS$_2$, . . . , PS$_n$ experiences Raman amplification only in the conversion fiber section KF$_2$. Thus, by appropriate choice of the lengths of the conversion fiber sections KF$_1$ and KF$_2$, it is possible to reduce and/or adapt the Raman amplification differences between the originally low-power pump signal PS$_1$ and the sum signal PS$_r$.

Figure 4:
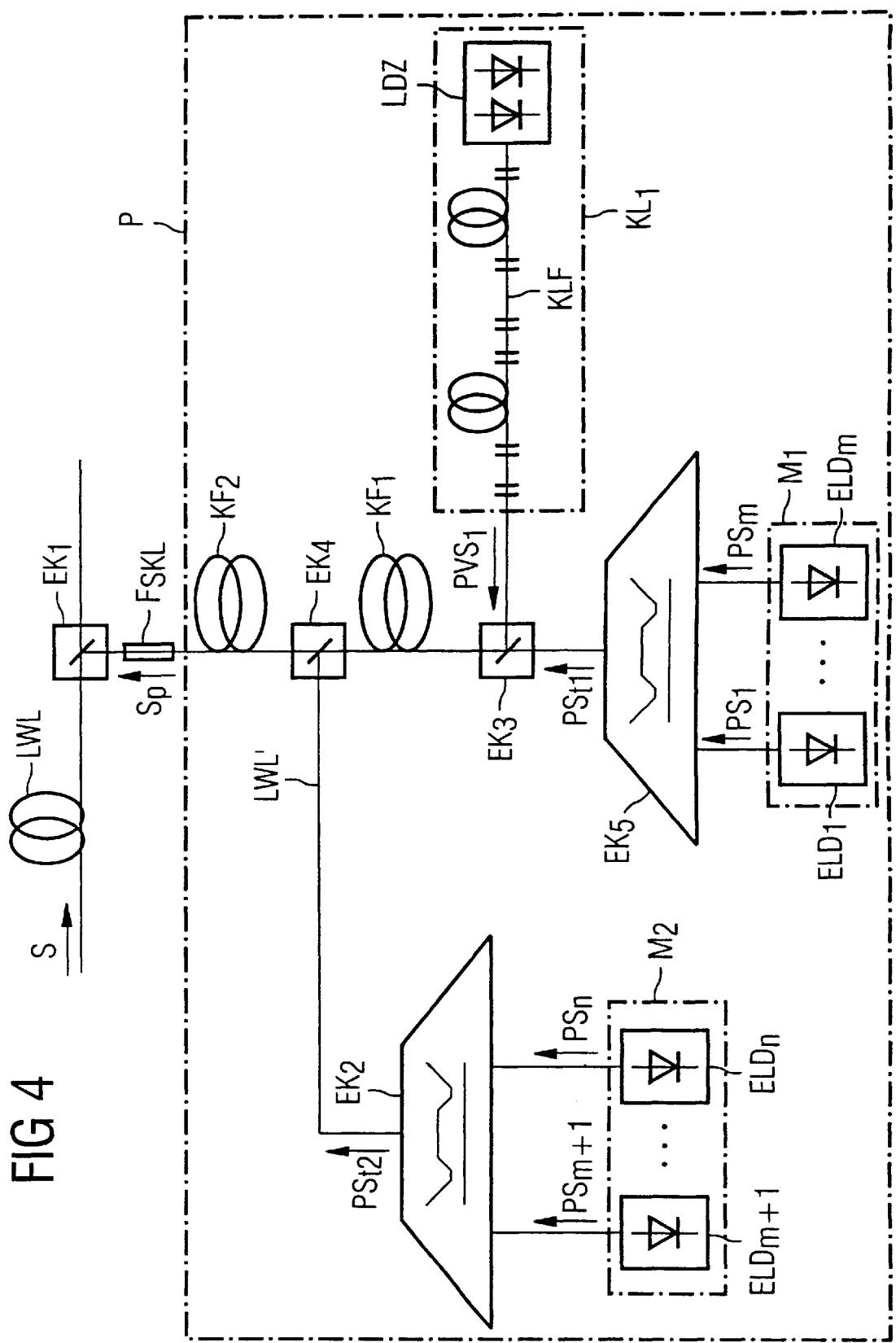
FIG. 4 shows a pump source according to the present invention with a conversion fiber split for output signals from a number of monomode laser diodes.

In the circuit illustrated in FIG. 4, and in contrast to the arrangement shown in FIG. 3, not only the output signal from a single monomode laser diode ELD$_1$ from the total number of monomode laser diodes ELD$_1$, . . . , ELD$_n$, but also a first group, which includes the output signals from a number of monomode laser diodes ELD$_1$, . . . , ELD$_m$ (n>m), is separated in a first module M$_1$, whose pump signals PS$_1$, PS$_2$, . . . , PS$_m$ are then fed into the first conversion fiber section KF$_1$ via a fifth input coupling device EK$_5$ in order to produce a first sum signal PS$_{r1}$. The further pump signals PS$_{m+1}$, . . . , PS$_n$ of the monomode laser diodes ELD$_{m+1}$, . . . , ELD$_n$, which are associated with a second group, of a second module M$_2$ are once again fed via the optical connecting fiber LWL' into the second conversion fiber section KF$_2$, via the fourth input coupling device EK$_4$ in order to produce the second sum signal PS$_{r2}$. Since it is transmitted from a longer distance in the conversion fiber, the first sum signal PS$_{r1}$ experiences similar Raman amplification to the second sum signal PS$_{r2}$.

Further variants are contemplated for pump sources P designed according to the present invention and having more than two series-connected conversion fiber sections KF$_1$, KF$_2$, . . . into which individual pump signals PS$_i$ (i=1 . . . N) or a number of sum signals PS$_{r1}$, PS$_{r2}$, . . . from a number of modules M$_1$, M$_2$, . . . with monomode laser diodes are fed.

Indeed, although the present invention has been described with reference to specific embodiments, those of skill in the art will recognize that changes may be made thereto without departing from the spirit and scope of the invention as set forth in the hereafter appended claims.

What is claimed is:

1. A pump source, comprising:
   a plurality of pump lasers whose pump signals are at different wavelengths and are fed into an optical fiber for Raman amplification of a transmitted broadband signal; and
   a conversion fiber connected via a first input coupling device to the optical fiber, wherein at least one pump laser feeds pump signals into the conversion fiber, and at least one further pump laser feeds further pump signals into the conversion fiber, resulting in Raman amplification of the pump signals in the conversion fiber.

2. A pump source as claimed in claim 1, wherein the pump lasers are monomode laser diodes whose pump signals each have a small output power.

3. A pump source as claimed in claim 2, wherein the further pump lasers are Raman cascade lasers.

4. A pump source as claimed in claim 3, wherein the further pump signals of the cascade lasers have shortest wavelengths of the pump source.

5. A pump source as claimed in claim 3, further comprising a filter, which blocks a wavelength of the respective cascade laser, connected into the optical fiber upstream of the first input coupling device for the pump signals.

6. A pump source as claimed in claim 3, wherein the further pump signal of the respective cascade laser has a higher power than a respective power of the pump signal of the monomode laser diode.

7. A pump source as claimed in claim 1, further comprising a periodic Mach-Zehnder interferometer multiplexer provided as a second input coupling device for combining the pump signals into the conversion fiber.

8. A pump source as claimed in claim 1, further comprising a dielectric filter provided as a second input coupling device for combining the pump signals into the conversion fiber, the second input coupling device having more inputs than the number of pump signals.

9. A pump source as claimed in claim 7, wherein the further pump signals of the cascade lasers with shortest wavelengths and the pump signals which originate from the pump lasers and have further inputs which correspond to longer wavelengths are supplied to the second input coupling device such that a wavelength separation between the further pump signals of the cascade lasers and the adjacent pump signal is increased.

10. A pump source as claimed in claim 8, wherein the further pump signals of the cascade lasers with the shortest wavelengths and the pump signals which originate from the pump lasers and have further inputs which correspond to longer wavelengths are supplied to the second input coupling device such that a wavelength separation between the further pump signals of the cascade lasers and the adjacent pump signal is increased.

11. A pump source as claimed in claim 1, wherein a plurality of the pump signals which originate from the pump lasers are combined to form sum pump signals.

12. A pump source as claimed in claim 3, wherein the conversion fiber has a plurality of series-connected conversion fiber sections, and the pump signals which originate from the pump lasers are fed, depending on a wavelength separation from the further pump signals of the cascade lasers, into the plurality of conversion fiber sections such that the Raman amplifications of the pump signals in the conversion fiber are at least approximately of a same magnitude.

13. A pump source as claimed in claim 12, wherein a plurality of the pump signals which originate from the pump lasers are combined to form sum pump signals, and the sum pump signals are each fed via input coupling devices into the respective conversion fiber section.

14. A pump source as claimed in claim 3, wherein the output power of the monomode laser diodes decreases as the wavelengths increase, as a result of which the increase in the output power levels, which increases with increasing wavelength separations between the further pump signals of the cascade lasers and the pump signals which originate from the pump lasers, is taken into account by Raman amplification of the pump signals.

15. A pump source as claimed in claim 1, further comprising at least one cascade laser and at least one of at least one Fabry-Perot laser and at least one DFB laser, in the form of monomode laser diodes, for uniform broadband Raman amplification of the broadband signal.

16. A pump source as claimed in claim 15, wherein the pump lasers include a cascade laser and a plurality of monomode laser diodes at wavelengths of 1409 nm or 1424 nm, 1438 nm, 1453 nm, 1467 nm, 1482 nm, 1497 nm and 1513 nm, resulting in output powers of 31.2 dBm or 22.3 dBm, 16.4 dBm, 13.9 dBm, 9.6 dBm, 0.5 dBm, −5 dBm, and −5 dBm before input coupling into the conversion fiber, and at wavelengths of 27.0 dBm or 23.5 dBm, 20.2 dBm, 19.9 dBm, 18.8 dBm, 14.4 dBm, 14.1 dBm, and 16.4 dBm at an end of the conversion fiber which lead to uniform Raman amplification of the broadband signal of approximately 10 dB in L band and in C band.

17. A pump source as claimed in claim 15, wherein the pump lasers include a cascade laser and four DFB lasers as monomode laser diodes provided for uniform Raman amplification of the broadband signal of approximately 10 dB in L band, with the cascade laser and the monomode laser diodes, at wavelengths of 1404 nm or 1453 nm, 1467 nm, 1482 nm and 1510 nm having output powers of 33.0 dBm or 13.3 dBm, 5.8 dBm, −5 dBm, and 4 dBm before input coupling into the conversion fiber, and at wavelengths of 23.1 dBm, 22.0 dBm, 20.0 dBm, and 24.1 dBm for the monomode laser diodes at an end of the conversion fiber.

* * * * *